No. 778,918. PATENTED JAN. 3, 1905.
C. L. TAYLOR.
PILE TURNING DEVICE.
APPLICATION FILED MAY 13, 1904.
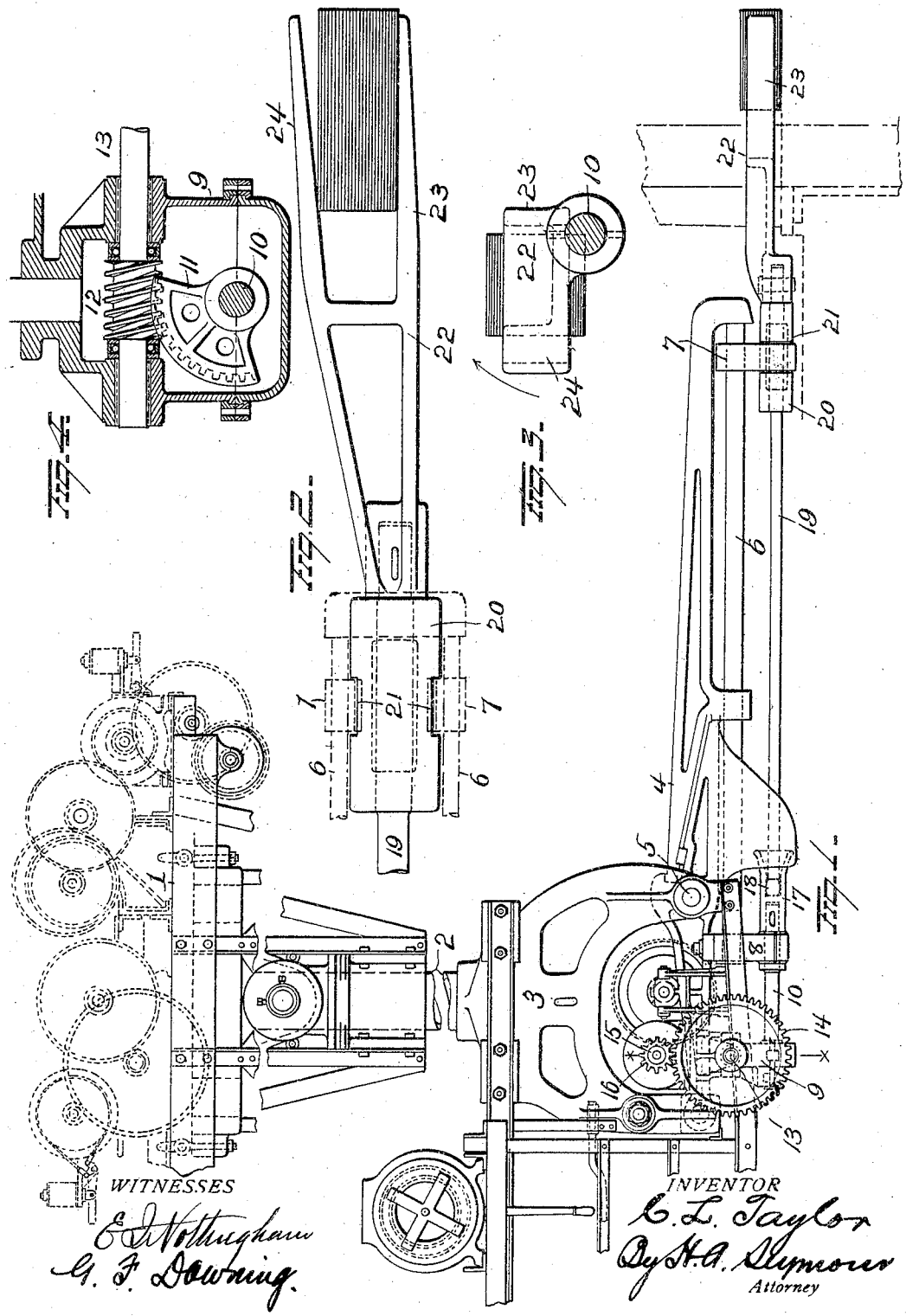

No. 778,918. Patented January 3, 1905.

UNITED STATES PATENT OFFICE.

CLARENCE L. TAYLOR, OF ALLIANCE, OHIO, ASSIGNOR TO THE MORGAN ENGINEERING COMPANY, OF ALLIANCE, OHIO.

PILE-TURNING DEVICE.

SPECIFICATION forming part of Letters Patent No. 778,918, dated January 3, 1905.

Application filed May 13, 1904. Serial No. 207,820.

*To all whom it may concern:*

Be it known that I, CLARENCE L. TAYLOR, of Alliance, in the county of Stark and State of Ohio, have invented certain new and useful Improvements in Pile-Turning Devices; and I do hereby declare the following to be a full, clear, and exact description of the invention, such as will enable others skilled in the art to which it appertains to make and use the same.

My invention relates to an improvement in pile-turning devices designed for attachment to the Morgan Engineering Company's type of ingot-charging machine, the object of the invention being to provide an apparatus capable of being attached to a machine for charging ingots, piles of skelp, or blooms, for turning the piles over while lying in the furnace and after they have been partly heated; and my invention consists in the parts and combination of parts and in the details of construction, as will be more fully explained, and pointed out in the claims.

In the accompanying drawings, Figure 1 is a view in side elevation of a portion of a charging-machine, showing my improvement applied thereto. Fig. 2 is a view in plan of the pile-turning fork and its shaft. Fig. 3 is an end view of the fork, and Fig. 4 is a view in section on the line $x$ $x$ of Fig. 1.

The charging apparatus may be of any desired construction, but is preferably of the Morgan Engineering Company's type of machine, such as is disclosed in their Patent No. 551,831, granted December 24, 1895, and comprising a trolley mounted to travel on a traveling bridge and carrying a depending stem, to which the ingot-grasping frame is pivoted. This frame carries shafts provided with tongs designed to grasp the piles of skelp, blooms, or ingots and is provided with mechanism for opening and closing said tongs. After the piles are partly heated it is necessary to turn them over without removing them from the furnace, and my present invention comprises simply a pile-turning attachment carried by the tongs and rotated by suitable mechanism carried by the main apparatus. While I have therefore illustrated my improvement in connection with the above type of machine, I do not wish to confine the application of my improvement to said type.

In the drawings, 1 represents a traveling trolley designed to be mounted on a traveling bridge and provided with motor and gearing for propelling it lengthwise the bridge and also with a motor and mechanism for raising and lowering the stem 2. This stem carries the frame 3 at its lower end, to which the ingot-grasping frame 4 is pivoted at 5. The frame 4 is provided with the parallel shafts 6, each of which carries an ingot-grasping tong 7. The two shafts 6 are coupled up so as to move in unison and are given a part rotation sufficient to open and close the tongs 7 by a motor and suitable gearing carried by the frame 4, which, as before explained, is carried by the lower end of stem 2. The frame 4 can be raised and lowered by moving the stem 2 up and down, and the frame 4 can be rocked on its pivot 5 by suitable mechanism carried in or by frame 3.

Depending from frame 3 are the bearings 8 and 9, in which the shaft 10 is mounted. This shaft is provided on its rear end within bearing 9 with the worm-sector 11, which meshes with the worm 12 on shaft 13, carrying the large pinion 14, which meshes with pinion 15 on the armature-shaft of the motor 16. From the above it is evident that if the motor be started the rotation of shaft 13 and the worm 12 thereon will cause a partial rotation of segment 11 and shaft 10, on which the segment is secured. Keyed to the opposite end of shaft 10 is the coupling 17. This coupling has a flaring or funnel-shaped mouth and angular bore in rear of said funnel-shaped mouth to receive the angular end 18 of the shaft 19. This angular end of the shaft conforms in shape to the bore of the coupling 17, so as to be rotated thereby, and is made curved longitudinally, as shown, so as to permit a slight vertical rocking movement of the shaft 19 when the frame 4 is rocked. Shaft 19 passes through block 20, which latter has grooved sides, as at 21, to receive the tongs 7, and the shaft 19 carries at its outer end just in advance of the block the fork 22. This fork 22 is provided with two tines 23 and 24, the inner face of tine 23 being in a vertical plane approximately coincident with the axis of shaft 19, while tine 24 is located at a plane to one side of shaft 19 and at an acute angle thereto and to the tine 23. The fork thus constructed and carried by the shaft 19 necessarily rotates or turns with the latter, and it is offset upwardly at the point of its attachment to shaft 19, so as to bring its lower edge above the axis of shaft 19, as clearly shown in Fig. 1, the axis of the shaft being approximately on a line with the sill of the furnace.

The piles or blooms are introduced into and removed from the furnace by the tongs 7; but after the piles are partially heated it is necessary to turn them while still in the furnace, and my attachment is simply for performing this latter operation. To turn a pile, the apparatus is brought to the front of the furnace and moved inwardly, the tines of the fork engaging the opposite sides of the pile. After the fork has been moved inwardly until both tines engage the pile a rocking movement of the shaft 19 causes the pile to turn in the direction indicated by the arrow in Fig. 3, or, in other words, it causes the inclined tine 24 of the fork to move up to a position over the straight tine, and as the one edge of the pile is in line with the horizontal axis of the shaft 19 the pile is turned without lifting it from the floor of the furnace. After the pile has been turned the apparatus may be withdrawn from the furnace. Then by opening the tongs 7 the block 20, shaft 19, and fork will be dropped and disconnected from the charging-machine until again needed, thus leaving the tongs free for handling the pile in charging or drawing the furnace.

It is evident that many slight changes might be resorted to in the relative arrangement of parts herein shown and described without departing from the spirit and scope of my invention. Hence I would have it understood that I do not wish to confine myself to the exact construction herein shown and described; but, Having fully described my invention, what I claim as new, and desire to secure by Letters Patent, is—

1. In an apparatus for turning piles, the combination with a charging-machine having grasping-tongs, of a turning-fork engaged by said tongs and means for imparting a partial rotation to the fork.

2. In an apparatus for turning piles, the combination with a charging-machine having grasping-tongs, of a two-tined fork engaged by said tongs and means for imparting a partial rotation to said fork.

3. In an apparatus for turning piles, the combination with a charging-machine having grasping-tongs, of a two-tined fork engaged by said tongs, one tine of the fork being coincident with the axis of the fork and the other located at an acute angle thereto, and means for imparting a partial rotation to the fork.

4. In an apparatus for turning piles, the combination with a charging-machine having grasping-tongs, of a fork engaged and supported by said tongs and means carried by the charging-machine for imparting a partial rotation to the fork.

5. In an apparatus for turning piles the combination with a charging-machine having grasping-tongs, a fork the stem of which is engaged and supported by said tongs, and means carried by the charging-machine for imparting a partial rotation to the fork.

6. An attachment for charging-machines comprising a pile-turning fork adapted to be supported by the tongs of the charging-machine and provided with a stem which detachably engages power mechanism carried by said charging-machine.

7. The combination with a charging-machine having a tongs-frame and tongs, a motor and a coupling, of a fork the stem of which is engaged by the tongs and which engages the coupling.

8. The combination with a charging-machine having grasping-tongs, a flaring coupling and a motor connected up to the coupling, of a turning-fork the stem of which is mounted in a bearing supported by the tongs, the said stem being detachably connected to the coupling.

In testimony whereof I have signed this specification in the presence of two subscribing witnesses.

CLARENCE L. TAYLOR.

Witnesses:
   A. L. ROBERTS,
   E. E. BROSIUS.